Aug. 30, 1932.   K. HENRICHSEN   1,874,522
CURVED CONTROL STICK
Filed May 1, 1931
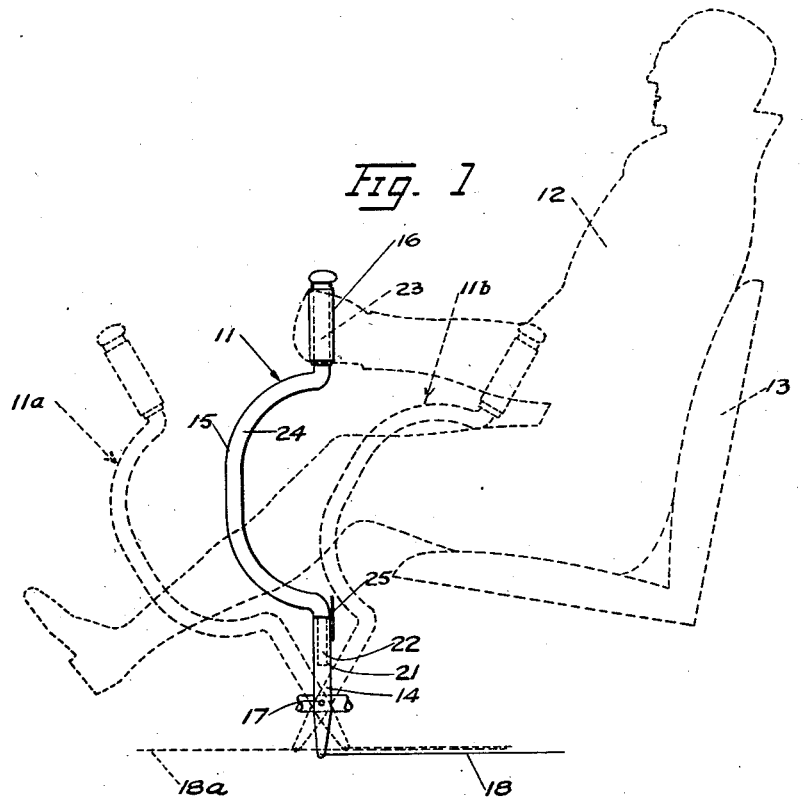
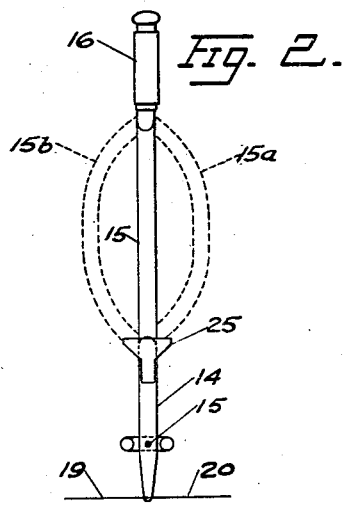
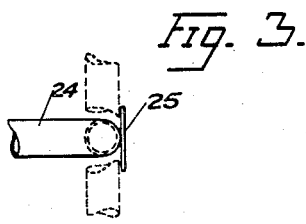
INVENTOR
*Knut Henrichsen*
BY
ATTORNEY Patented Aug. 30, 1932

1,874,522

UNITED STATES PATENT OFFICE

KNUT HENRICHSEN, OF GARDEN CITY, NEW YORK, ASSIGNOR TO CURTISS-WRIGHT AIRPLANE COMPANY, A CORPORATION OF MISSOURI

CURVED CONTROL STICK

Application filed May 1, 1931. Serial No. 534,162.

This invention relates to a control lever for airplanes.

Prior to my invention, control levers or "sticks" for airplanes have been provided capable of operating the elevators and ailerons thereof for the purpose of controlling the lateral and longitudinal balance of the airplane. However, in the case of small airplanes, where space in the cockpit is limited, it often happens that the pilot's body interferes with the movement of the "stick".

One of the objects of this invention is to provide a new and improved control "stick" for airplanes.

A further object of the invention is to provide such a control "stick" especially adapted for use in small cockpits of airplanes.

Further objects of the invention will be apparent from a reading of the subjoined specification and claims and from a consideration of the accompanying drawing.

In order to explain the invention more clearly, one embodiment thereof is shown in said drawing, in which:

Fig. 1 is a view in side elevation of a control stick constructed according to my invention and showing in dotted lines the position of the pilot and his seat and also in dotted lines forward and rearward positions to which the control stick may be moved;

Fig. 2 is a view in elevation of the control stick shown in Fig. 1 looking at it from the pilot's seat and showing in dotted lines positions to which the curved section of the "stick" may be moved; and Fig. 3 is a view of the control stick shown in Fig. 1, shown in plan with parts broken away and illustrating a detail of the construction by which the movement of the rotatable part of the stick is limited.

Referring specifically to the drawing, I have shown in Fig. 1 a control stick 11 held by the pilot 12 who is seated in the seat 13 of the cockpit of an airplane. The control stick comprises a relatively fixed lower section 14, a curved middle section 15 and a handle 16. The lower section is pivoted for universal movement at 17 and has secured to the lower end thereof control cables 18 and 18ª leading to the elevator of the airplane and control cables 19 and 20 leading to the ailerons of the airplane. In the upper end of said section 14 there is formed a socket 21. The middle section 15 may be designated the curved section and is formed with a lower cylindrical portion 22 reduced in size to fit in the socket 21 of the lower section 14. The upper portion 23 of the middle section 15 is also cylindrical in shape and has its longitudinal axis always exactly aligned with the longitudinal axis of the lower portion 22. The intermediate portion 24 which connects the upper and lower aligned portions is curved so that said middle section may at times encircle the leg of the pilot 12 and thus minimize the interference of the leg with the action of the control stick. The upper cylindrical portion 23 fits in a socket in the handle 16 so that the middle section 15 is substantially free to rotate within the sockets in lower section 14 and in the handle 16, but nevertheless connects the upper and lower sections and maintains them in continuous alignment. It may thus be seen that the curved section 15 may rotate about a longitudinal axis which coincides with the aligned axes of the handle 16 and the lower section 14 but that the lower section 14 and the handle 16 do not rotate with the middle section 15, and that the handle 16 and the lower section 14 coact as far as operation is concerned, just as if they were parts of one continuous "stick" or operating control lever.

I have provided means for preventing the intermediate portion 24 from turning too far to the rear. To this end I have secured a stop plate 25 to the relatively fixed lower section 14 against which plate the curved portion 24 is adapted to contact to prevent the curved section 15 from turning too far rearward.

It is thought that the operation of my improved control "stick" will be obvious from the above explanation. Inasmuch as the handle 16 and the lower section 14 of the "stick" are always maintained in exact alignment, movement of the handle to move the control surfaces operates the lower section of the control "stick" just as if the handle and the lower section were directly connected in the usual manner. However, if at any time the positions of the pilot's leg would tend to interfere with movement of the control "stick" the section 15 may rotate about the longitudinal axis of the "stick" and (allowing the pilot's leg to fit within the curve of the section 15) permit movement of the control "stick" to any desired position. As shown in dotted lines in the position 11ª and 11ᵇ the stick may be moved to a forward position or to a rear position. When moved to a rear position as shown, the pilot's leg fits within the curve of the stick.

It is to be understood that the above described embodiment of the invention is for the purpose of illustration only, and various changes may be made therein without departing from the spirit and scope of the invention.

I claim as my invention:

1. A control stick for aircraft comprising a pivoted section, a control cable connected to said pivoted section, said section being formed with a socket, and a curved section having a cylindrical extension mounted for rotation in said socket.

2. A control stick for aircraft comprising a pivoted section having a socket formed in one end thereof, and a cooperating section having a leg receiving portion and mounted within said socket for rotation about the longitudinal axis of said pivoted section to bring said leg receiving portion into position to receive the leg of the pilot.

3. A control stick for aircraft comprising a handle, a cooperating section having a leg receiving portion and mounted on said handle for rotation relative to said handle and about the longitudinal axis of said handle to bring said leg receiving portion into position to receive the leg of the pilot.

4. A control stick for aircraft comprising a handle, a cooperating section mounted on said handle for rotation relative to said handle and about the longitudinal axis of said handle, said last named section being curved to accommodate the leg of the pilot in certain of the operative positions of the control stick.

5. A control stick for aircraft comprising a handle having a cylindrical socket therein; a cooperating section formed with a cylindrical portion positioned in the cylindrical socket, mounted therein for rotation about the longitudinal axis of the handle, and also having a second cylindrical portion; a third section also formed with a socket into which said second cylindrical portion of the cooperating section fits; and means for pivotally mounting said last named section.

6. A control stick for aircraft comprising a handle having a socket formed therein, a laterally offset section formed with a cylindrical projection fitting in said socket and formed with another cylindrical portion aligned with the first named cylindrical portion, a third section also formed with a socket into which said last named cylindrical extension fits, and means for pivotally mounting said last named section.

7. A control stick for aircraft comprising a handle, a lower pivoted section, and an intermediate curved section rotatably mounted on said handle and said lower section and adapted to be rotated with respect to said handle and lower section by contact with the body of the pilot when the control stick is being operated.

8. A control stick for aircraft comprising a handle, a lower pivoted section, an intermediate curved section rotatably mounted on said handle and said lower section and adapted to be rotated with respect to said handle and lower section by contact with the body of the pilot when the control stick is being operated, and means for limiting the rotation of said curved section.

In testimony whereof I hereunto affix my signature.

KNUT HENRICHSEN.